United States Patent
Boston et al.

(10) Patent No.: US 8,285,423 B2
(45) Date of Patent: Oct. 9, 2012

(54) AGGREGATE ENERGY MANAGEMENT SYSTEM AND METHOD

(75) Inventors: Stephen B. Boston, New Milford, CT (US); Kiran Diwakar, Pune (IN); Paul A. Patti, Nashua, NH (US)

(73) Assignee: CA, Inc., Islandia, NY (US)

( * ) Notice: Subject to any disclaimer, the term of this patent is extended or adjusted under 35 U.S.C. 154(b) by 387 days.

(21) Appl. No.: 12/246,240

(22) Filed: Oct. 6, 2008

(65) Prior Publication Data
US 2010/0087963 A1 Apr. 8, 2010

(51) Int. Cl.
*G06F 5/00* (2006.01)
*G06F 9/00* (2006.01)
*G06F 11/00* (2006.01)
*G06F 17/00* (2006.01)
*G06Q 10/00* (2012.01)

(52) U.S. Cl. .......................................... 700/295; 705/8
(58) Field of Classification Search .................. 700/295; 705/8
See application file for complete search history.

(56) References Cited

U.S. PATENT DOCUMENTS

| | | | |
|---|---|---|---|
| 6,785,592 B1 | 8/2004 | Smith et al. | |
| 6,952,782 B2 | 10/2005 | Staiger | |
| 7,272,735 B2 | 9/2007 | Fung | |
| 7,275,000 B2 | 9/2007 | Howell et al. | |
| 7,342,507 B2 | 3/2008 | Jonker et al. | |
| 7,386,739 B2 | 6/2008 | Ghiasi et al. | |
| 2003/0193777 A1* | 10/2003 | Friedrich et al. | 361/687 |
| 2004/0024483 A1* | 2/2004 | Holcombe | 700/122 |
| 2004/0044914 A1* | 3/2004 | Gedeon | 713/300 |
| 2007/0239317 A1* | 10/2007 | Bogolea et al. | 700/276 |
| 2009/0083167 A1* | 3/2009 | Subbloie | 705/34 |
| 2009/0112522 A1* | 4/2009 | Rasmussen | 702/186 |
| 2009/0187782 A1* | 7/2009 | Greene et al. | 713/340 |
| 2009/0281677 A1* | 11/2009 | Botich et al. | 700/295 |

* cited by examiner

*Primary Examiner* — Mohammad Ali
*Assistant Examiner* — Sivalingam Sivanesan
(74) *Attorney, Agent, or Firm* — Schwegman Lundberg & Woessner, P.A.

(57) ABSTRACT

A method includes collecting energy utilization information for machines in a center, such machines originating from multiple vendors. An energy management object is instantiated for each machine, wherein energy utilization is aggregated using such energy management objects. Energy utilization for the center is aggregated and may be used for controlling overall energy utilization for the center.

20 Claims, 6 Drawing Sheets

US 8,285,423 B2

AGGREGATE ENERGY MANAGEMENT SYSTEM AND METHOD

BACKGROUND

Data centers utilize equipment from many different manufacturers. Such equipment consumes significant energy, and may generate heat that should be removed from the equipment to ensure proper operation of the equipment and avoid damage to the equipment. Some vendors of the equipment have the ability to collect energy data regarding their equipment. Such data may include directly measured heat generated by the devices, or may estimate energy utilization and heat generation by evaluating performance data for the devices.

SUMMARY

A method includes collecting energy utilization information for computing, communication, or other information processing, power consuming device or devices, in a collective physical or logical entity, such as but not limited to, a data center. Such collective physical or logical entity may be referred to as a center. Such devices may originate from multiple vendors and may be referred to as machines. An energy management object is instantiated for each machine, wherein energy utilization is aggregated using such energy management objects. Energy utilization for the center is aggregated and may be used for controlling overall energy utilization for the center.

In one embodiment, a method includes collecting energy utilization information for heterogeneous equipment in a center, such equipment originating from multiple vendors. The energy utilization for the center is aggregated. Future energy utilization is predicted as a function of historical aggregated energy utilization trends. Energy utilization may be managed for the center as a function of the aggregated energy utilization for the center and the predicted future energy utilization.

In yet a further embodiment, a method includes collecting energy utilization information for heterogeneous equipment in multiple data centers, such equipment originating from multiple vendors. The energy utilization for each center is aggregated. Energy utilization for the centers is managed as a function of the aggregated energy utilization for the centers.

DETAILED DESCRIPTION

Figure 1:
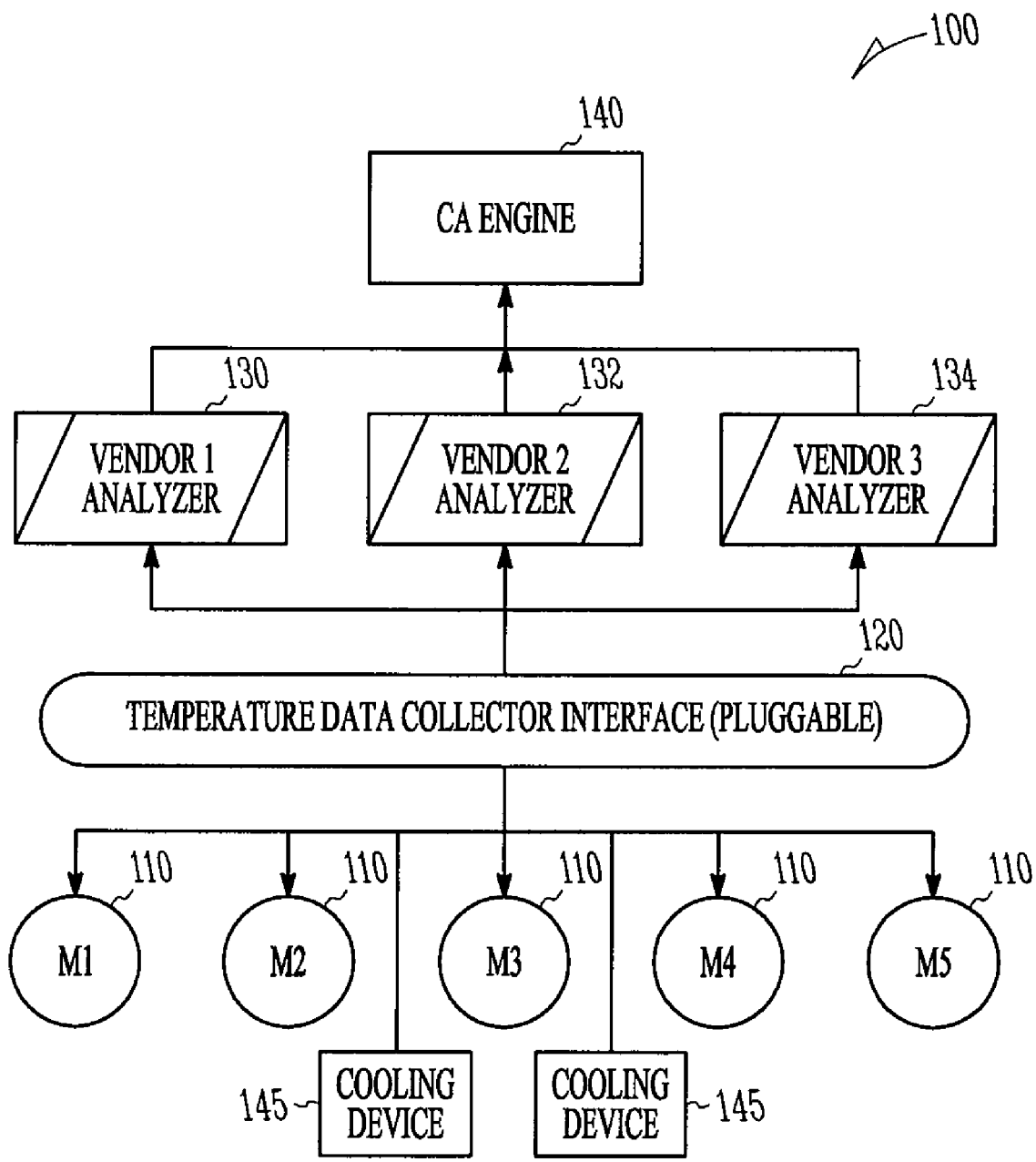
FIG. 1 is a block diagram illustrating an energy management system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In various embodiments, energy utilization information is collected for physical entities that consume energy, including computing, communication, or other information processing, power consuming device or devices, in a collective physical or logical entity, such as but not limited to, a data center. Such collective physical or logical entity may be referred to as a center. Such physical entities are referred to as machines herein and may originate from multiple vendors. Some vendors may collect and/or report on energy consumption from the machines they provide. However, centers, such as data centers contain many different machines from many different vendors. Some organizations may have multiple data centers in different areas of a country or in different countries that each consume energy and process workloads.

Cooling systems consume additional energy to run fans and chillers to cool air to maintain the machines at proper operating temperatures. The energy utilization information for machines in a center may be aggregated and may be compared to historical trends, workload history and scheduled processing jobs to predict future consumption of energy. Workloads may be rebalanced between centers to reduce energy consumption in centers that may be reaching predetermined thresholds and/or to take advantage of specific types of energy (i.e. alternatives such as hydroelectric, solar, etc.). Interfaces may be provided to cooling equipment to provide the ability to control them based on the aggregated energy utilization and trend information. For example, chillers may be turned on in anticipation of increased cooling needs.

FIG. 1 is a block diagram illustrating an energy management system 100 according to an example embodiment. A plurality of machines are illustrated at 110 from which energy utilization information is to be collected. In one embodiment, a data collection interface 120 is coupled to the machines via a wired or wireless connection and may be utilized to collect energy utilization data from the machines 110. In some embodiments, the data collection interface 120 may include logic to facilitate such data collection. In various embodiments, the machines 110 provide different types of information to interface 120 from which energy utilization information may be obtained. Some machines 110 may directly provide a measurement of energy consumed, where others may provide temperature information or other information such as CPU utilization, fan speed, etc., from which energy utilization information may be calculated or derived indirectly. Interface 120 may include a communication protocol, such as SNMP or FTP or other protocol to facilitate collection and communication of the energy utilization information from the machines 110. Machines 110 may provide an exposed SDK API or other device.

The interface 120 is coupled to multiple analyzers 130, 132, 134 in one embodiment. The analyzers may be vendor specific in one embodiment, such as analyzer 130 for vendor 1 devices, analyzer 132 for vendor 2 devices and analyzer 134 for vendor 3 devices. Analyzers may also be provided for a group of devices that provide the same type of energy utilization information. The analyzers in one embodiment are machine specific analyzers that operate to collate information from all the devices for one or more vendors and aggregate the energy utilization for such devices from each vendor.

For devices that do not support obtaining direct variables related to energy utilization, SNMP, simple network management protocol messages (or other applicable protocols) may be used to collect MIB, (management information base) data from the devices whose power utilization requirements can be estimated. Such estimations may be a function of number and level of CPUs, disk drives, fans in use, etc. For devices that do support obtaining direct variables related to energy usage, such as current and voltage levels, such variables may be collected and stored using the same protocols.

The analyzers in one embodiment are coupled to an engine 140 that receives the energy utilization information from the device specific analyzers 130 132, 134 and aggregates the energy utilization for a center, such as a data center. In one embodiment, the aggregate energy utilization is equal to A*(vendor 1 energy utilization)+B*(vendor 2 energy utilization)+C*(vendor 3 energy utilization). The variables A, B and C may be weights that signify the percentage of machines in the center. For example, if there are more vendor 1 machines in a center than vendor 2 machines, the weight for vendor 1 machines will be more than the weight for vendor 2 machines. In further embodiments, each individual machine's energy utilization is directly added to arrive at an aggregate energy utilization.

In one embodiment, cooling devices 145 may be coupled to the interface 120 and to the engine 140, with an interface to allow controlling of the cooling devices as a function of the aggregate energy utilization of the center. Cooling devices 145 may be started, stopped, or controlled to increase or decrease temperatures based on alerts or alarms generated either in the center, or via the engine 140 when energy utilization thresholds are met or exceeded.

Engine 140 in one embodiment uses the energy utilization information to generate tables, charts, and graphs illustrating energy usage. Traps may be generated to inform power supply equipment and energy providers of a center's cyclical, peak, minimum or other level of power consumption needs. This provides the capability to send traps when energy demands rise or fall to certain levels. In further embodiments, engine 140 may control cooling equipment based on alerts or alarms obtained from various systems or projected energy utilization to reduce peak energy demands of a center.

In a further embodiment, the system and engine 140 provides advance communication of power needs based on adjustable historical trends, workload history and scheduled processing jobs for a group of devices from heterogeneous sources. Just in time utility support power delivery may be obtained from such communications, freeing up power for other utility customers during peak timeframes. Live notification of predefined energy level usage may be provided via integration with other technologies such as fault alarming tools and data performance monitors and controllers. When deployed on a large scale as either a central engine coupled to multiple dispersed centers of equipment or distributed engines in multiple centers, the system may be used to help prevent grid brownouts and blackouts, as well as reducing center power costs. Further, the system may provide vendor agnostic, dynamic and integrated single solutions that helps customers obtain consolidated and aggregated data for their energy requirements from heterogeneous sources.

Figure 2:
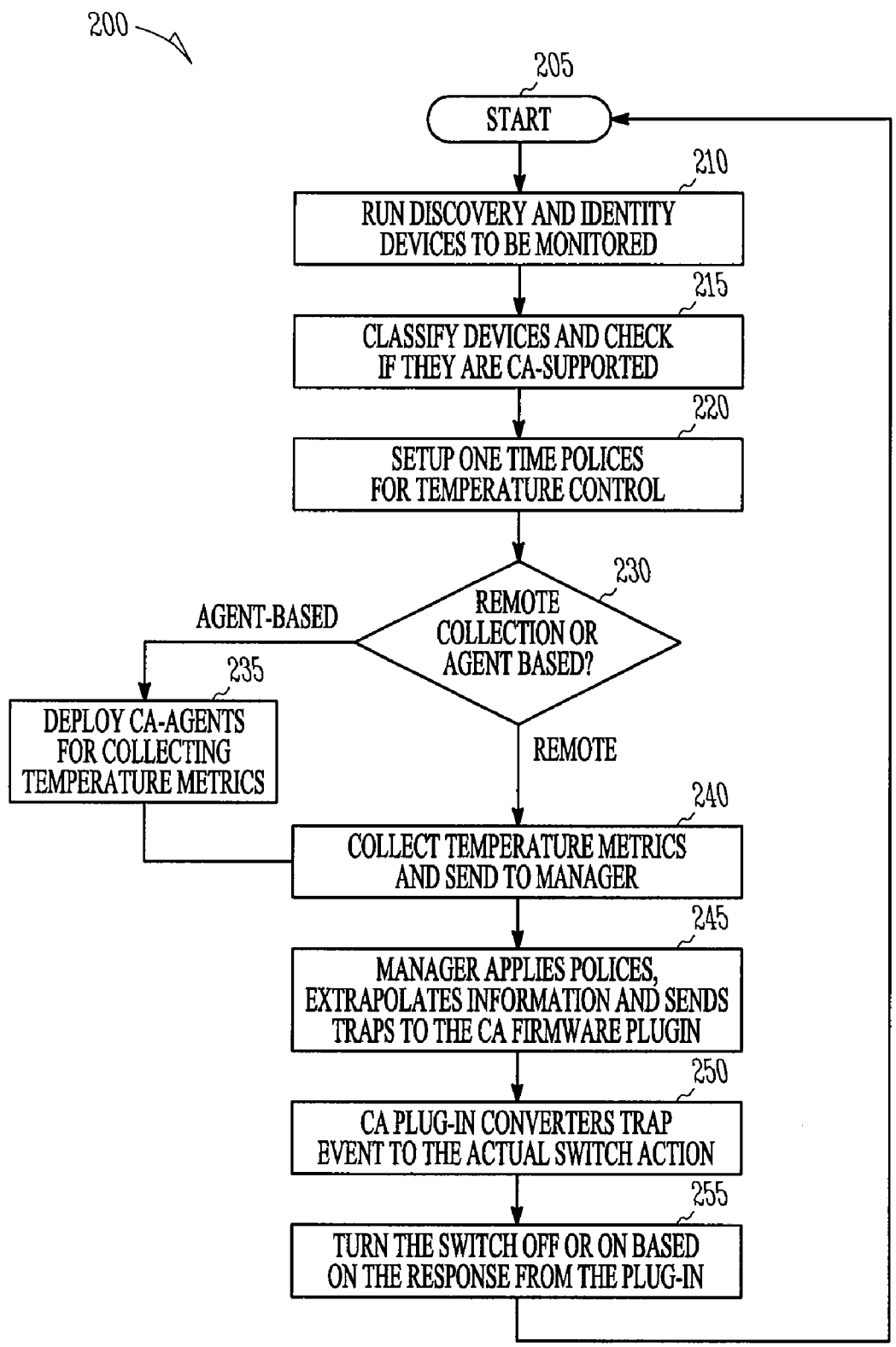
FIG. 2 is a flowchart illustrating a method that includes discovery of devices, obtaining power utilization information from the devices and using the power utilization information to perform selected control operations on a center according to an example embodiment.

FIG. 2 is a flowchart illustrating a method 200 that includes discovery of devices, obtaining power utilization information from the devices and using the power utilization information to perform selected control operations on a center, such as a data center having multiple pieces of computer related systems and devices. The method starts at 205, and devices to be monitored are discovered and identified by running a discover routine at 210. The term discover may include any means by which one may become aware of machines, such as sending probes, or other communications which reveal a device, and including having awareness of such devices provided by a user or other system. At 215, the devices are classified and a check is made to determine if they are supported. At 220, policies are set up one time for temperature control of the devices. A determination is made at 230 if the devices support remote collection of power utilization data, or an agent based method of collecting power utilization data. If agent based, agents are deployed at 235 for collecting temperature metrics in one embodiment. As described above, other metrics may also be used. At 240, temperature metrics are collected from agents, and may also be remotely collected. Such temperature metrics are sent to a manager. The manager at 245 applies policies, extrapolates information and sends a trap or event to an interface to a fan via a firmware plug-in in one embodiment. At 250, the plug-in converts the trap or event to actual switch or control actions, which are performed at 255 such as by turning a switch off or on based on the response from the plug-in.

Figure 3:
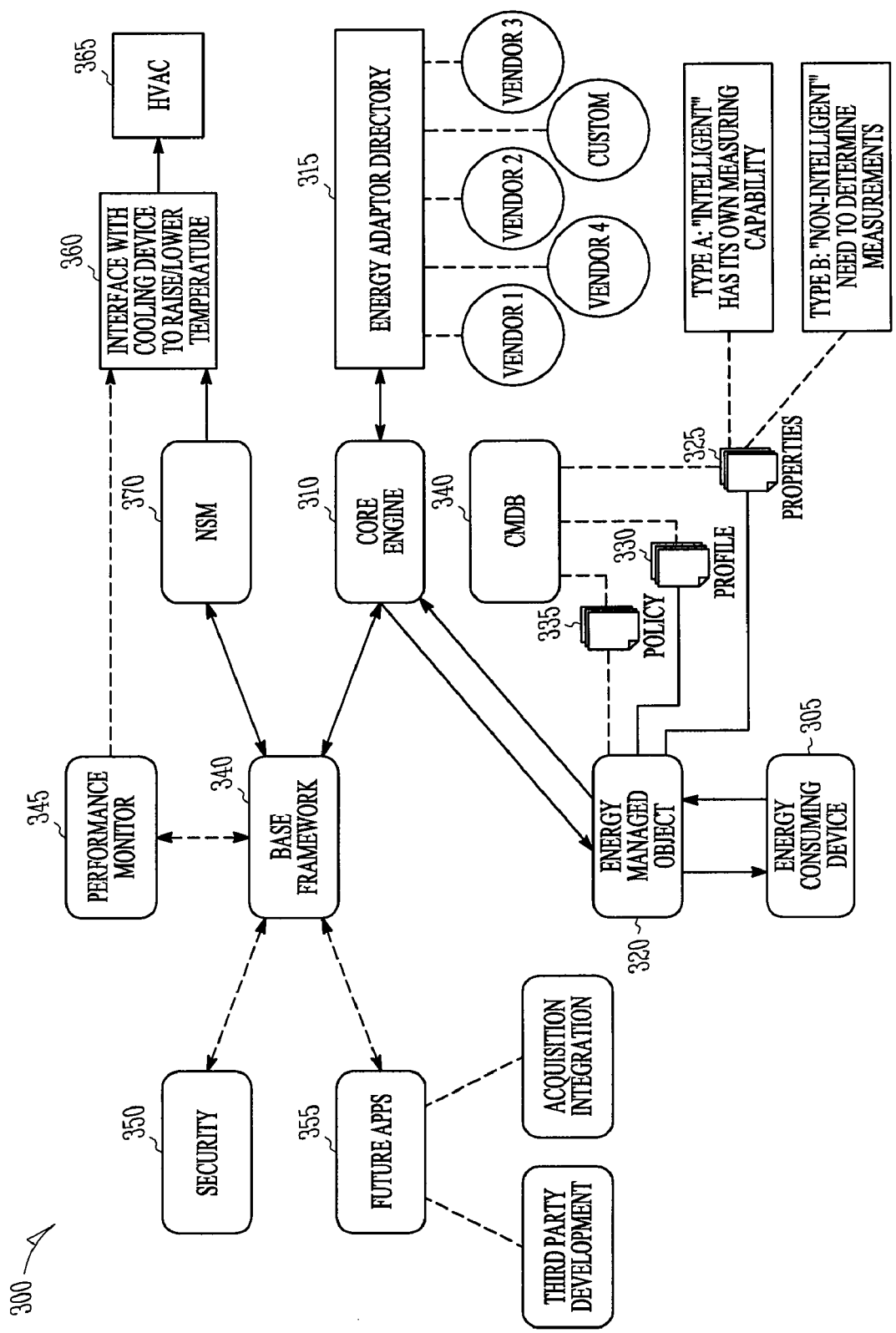
FIG. 3 is a block diagram of a further embodiment of an energy management system according to an example embodiment.

A block diagram of a further embodiment of an energy management system is shown at 300 in FIG. 3. The system 300, also referred to as a platform, is shown in simplified form, as only one energy consuming device 305 is illustrated. Device 305 is meant to be representative of many such energy consuming devices. A core engine 310 becomes aware of device 305 and may search an energy adaptor directory 315, which contains information about each of the devices that may be encountered. The core engine 310 may use adapters from the adaptor directory 315 to interface with energy consuming devices 305 to obtain energy utilization information. The adapters may be used to directly connect to the devices 305 to obtain information, or to make network or web services calls and obtain the data in some embodiments. In further embodiments, information about the devices may be programmed in by a technician when setting up a system.

For each energy consuming device 305, an energy managed object 320 is instantiated, which contains one or more properties 325, one or more profiles 330 and one or more policies 335. Energy managed object 320 may be stored in a CMDB (central management data base) 340 in one embodiment. In one embodiment, the properties may identify the energy consuming device 305 as an intelligent device with its own measuring capabilities, or as a non-intelligent device for which measurements need to be determined. Functions that may be provided by energy managed objects may include the facilitation of aggregation of power management for groups of devices and the provision of vendor independent and technology independent management of the associated devices or machines.

In one embodiment, core engine 310 is coupled to a base framework 340, which is comprised of one or more systems or applications to provide further functions. The base framework 340 allows energy managed objects to be called by other applications. The core engine 310 may interface with such systems and applications, such as a performance monitor 345, security system 350, future applications 355 and existing applications such as CA's NSM (Network and Systems Management) which along with performance via and interface 360 to environmental control and utility devices, to include gas, electric, water, air handling, and refrigeration systems, to raise or lower temperatures in a center via heating, ventilation and air conditioning (HVAC) systems 365.

Some example properties of an energy managed object 320 may include attributes such as manufacturer, BTU output, power source, cooling method, and other attributes that may extend beyond those related to energy management. The properties may have inheritance. Example properties may include rules that may be external to the energy management system 300.

Energy managed objects 320 may also have properties related to aggregation of devices into groups. Such properties may include devices that need to be powered on/off/cycled, hot spot/cold spots, objects belonging to each data center, objects belonging to each UPS (uninterruptible power supply), heat generation ranges—low/medium/high, manufacturer, devices with their own measurement, etc.

One example rule of energy managed objects 320 may relate to turning on an alarm when a temperature reaches a threshold, such as 100 degrees, and notifying a help desk. Many other such rules may be applied, such as device type, data retrieval protocol, manufacturer, frequency or schedule of data collection, energy footprint: AC/DC, battery, volts/amps, criticality, supports own energy data measurement, self-cooling, applications the device supports, devices the device supports, such as routers supporting downstream switches, devices supported by this device such as switches needing routers to connect up stream, data center number, zone, building, etc. Policies 335 may also have inheritance.

Profiles 330 relate to the behavior and operation of the device 305. Put another way, a profile 330 may describe what a device is supposed to do and when. Examples may include router actions, running time, time of day, week, month settings, minimum and maximum energy requirements, energy supply limits, heat measurement minimum and maximum to name a few. Profiles 330 may also have inheritance. In one embodiment, a profile describes behavior and operation of a device within the context of directing work to a specific machine or managing the behavior of a specific computing, communication, or other information processing, power consuming device or devices in a collective physical or logical entity, such as but not limited to, a data center.

Some example policies of an energy managed object 320 may include policies 335 at an object and a group level. They may be separate from the energy management system 300 and may apply to one or more energy managed objects 320. Examples include never powering off a critical device, device power on power off schedules, method of power, such as line power, UPS, generator, etc, and level of alarm if heat output is exceeded. The heat output may be measured in terms of energy utilization, or actual temperature measurements in various embodiments. Policies may interact with each other in some embodiments.

Figure 4:
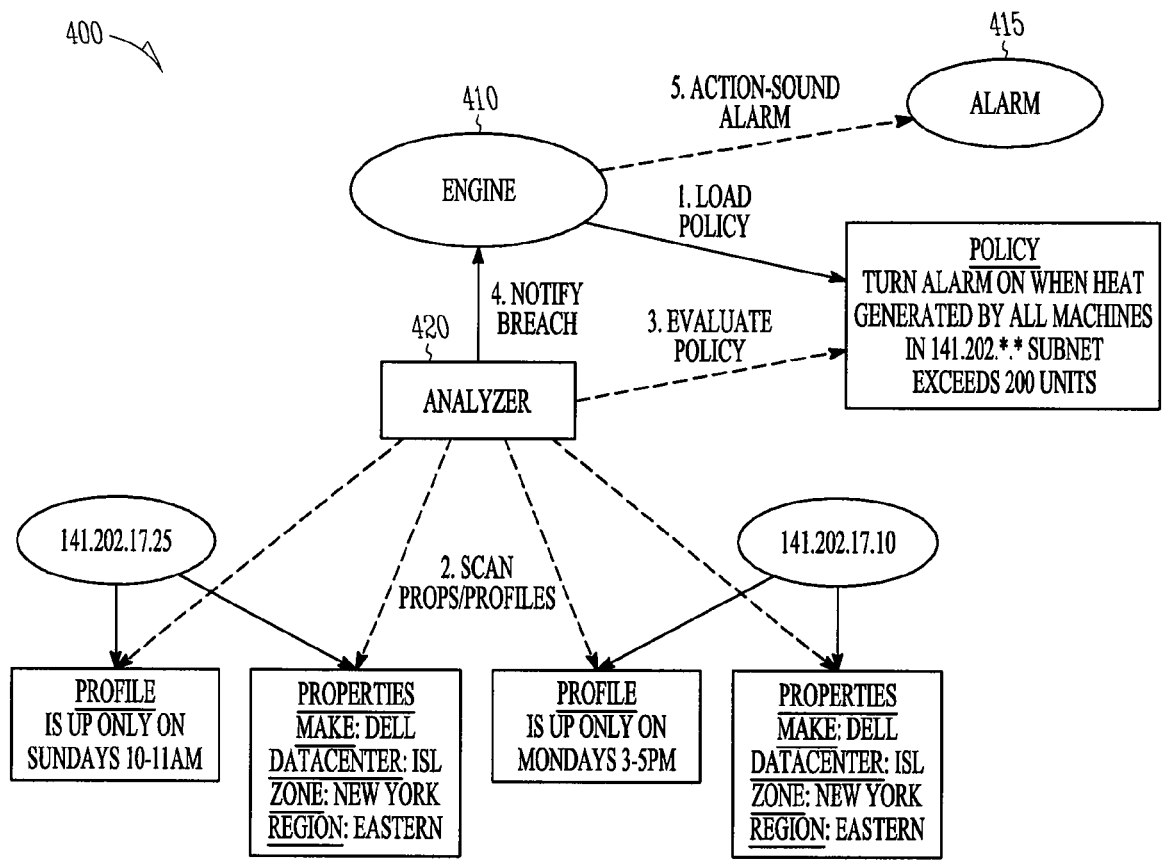
FIG. 4 is a bock flow diagram of execution of a subnet policy is illustrated according to an example embodiment.

An example bock flow diagram of execution of a subnet policy is illustrated in FIG. 4 at 400. A subnet may be thought of as one or more devices that are coupled to a network utilizing addresses, such as IP addresses. In this example, a subnet may be defined essentially as all devices or machines having an address that starts with "141.202." An engine 410 loads a policy as indicated at "1. LOAD POLICY". The policy in this instance instructs that an alarm 415 be turned on when heat generated by all machines in the subnet "141.202.*.*" exceeds 200 units. The units may be any measurement of heat desired, such as BTUs or KBTUs, etc.

An analyzer 420 may be used to scan the properties and profiles of the machines in the subnet as indicated at "2. SCAN PROPS/PROFILES". The profiles in this example indicate that one machine is only up on Sundays from 10-11 AM, and the other machine is only up on Mondays from 3-5 PM. Both machines are from the same manufacturer, and in the same data center referred to as ISL, in a New York zone and an Eastern region. The analyzer then evaluates the policy from information obtained from the machines as indicated at "3. EVALUATE POLICY". If a threshold of 200 units is exceeded per the policy, a notification of the breach is provided to engine 410 as indicated at "4. NOTIFY BREACH", and the alarm 415 is sounded as indicated at "5. ACTION—SOUND ALARM".

Figure 5:
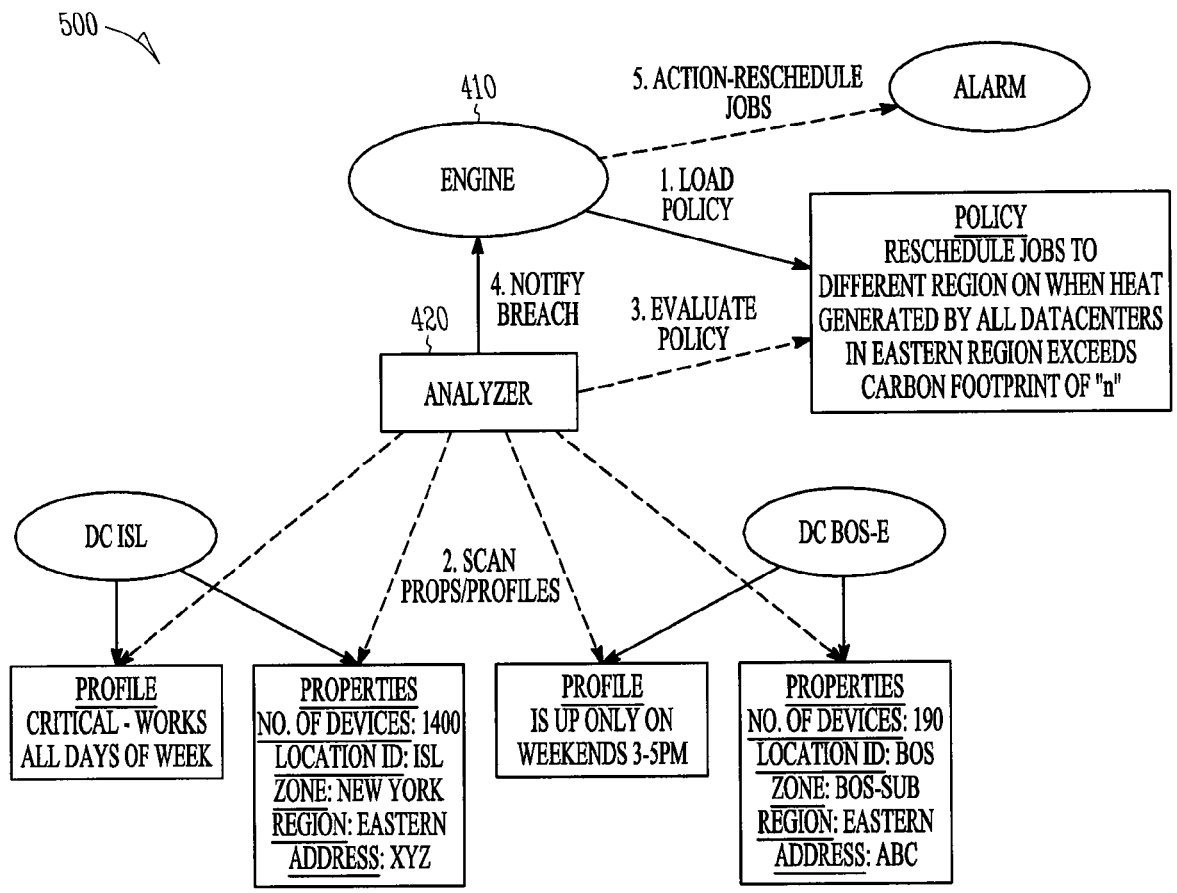
FIG. 5 is a block flow diagram of execution of a policy to be applied to devices in a region according to an example embodiment.

FIG. 5 is a block flow diagram of execution of a policy to be applied to devices in a region illustrated in FIG. 5 at 500. The numbering of components is consistent with FIG. 4. In this example, a region may be defined essentially as all devices or machines having a property of a selected region, in this case the eastern region. An engine 410 loads a policy as indicated at "1. LOAD POLICY". The policy in this instance instructs that jobs should be rescheduled to a different region when heat generated by all data centers in the eastern region exceeds a carbon footprint of "n". The carbon footprint threshold may be calculated from energy utilization information or temperature information as desired. In further embodiments, the threshold may be expressed in energy or heat units as desired.

An analyzer 420 may be used to scan the properties and profiles of two aggregations of machines in the eastern region as indicated at "2. SCAN PROPS/PROFILES". The profiles in this example indicate that one aggregation of machines is critical and works all days of the week, and the other aggregation of machines is only up on weekends from 3-5 PM. One aggregation of machines includes 1400 devices with a location ID of ISL, a zone of New York, a region of eastern and address of XYZ. The other aggregation of machines includes 190 devices with a location ID of BOS, a zone of a Boston suburb. The aggregation is in the eastern region and has a physical address of ABC. The analyzer then evaluates the policy from information obtained from the aggregations of machines as indicated at "3. EVALUATE POLICY". If a threshold of "n" for the carbon footprint is exceeded per the policy, a notification of the breach is provided to engine 410 as indicated at "4. NOTIFY BREACH", and a a system referred to as autosys 510 is used to reschedule some jobs away from the eastern region to reduce the carbon footprint, as indicated at "5. ACTION—RESCHEDULE JOBS".

As indicated above, energy utilization may be measured in terms other than carbon footprint in further embodiments. In one embodiment, energy utilization is aggregated into kilowatt hours, consistent with power distribution grids. The thresholds may than be expressed in the same format, and used to redistribute work, or control devices in a center to more efficiently utilize energy.

In various embodiments, the system can scale from a single machine to an entire zone or region. Inheritance capabilities of the energy management objects can provide real life hierarchical mapping. Since every function/component is independent of other function/component, any engine, data collector, any manager and any action anywhere can be hooked in. In further embodiments, multiple overlapping rules can be set for the same device. Priority determinations may be made to determine which rule to fire.

Figure 6:
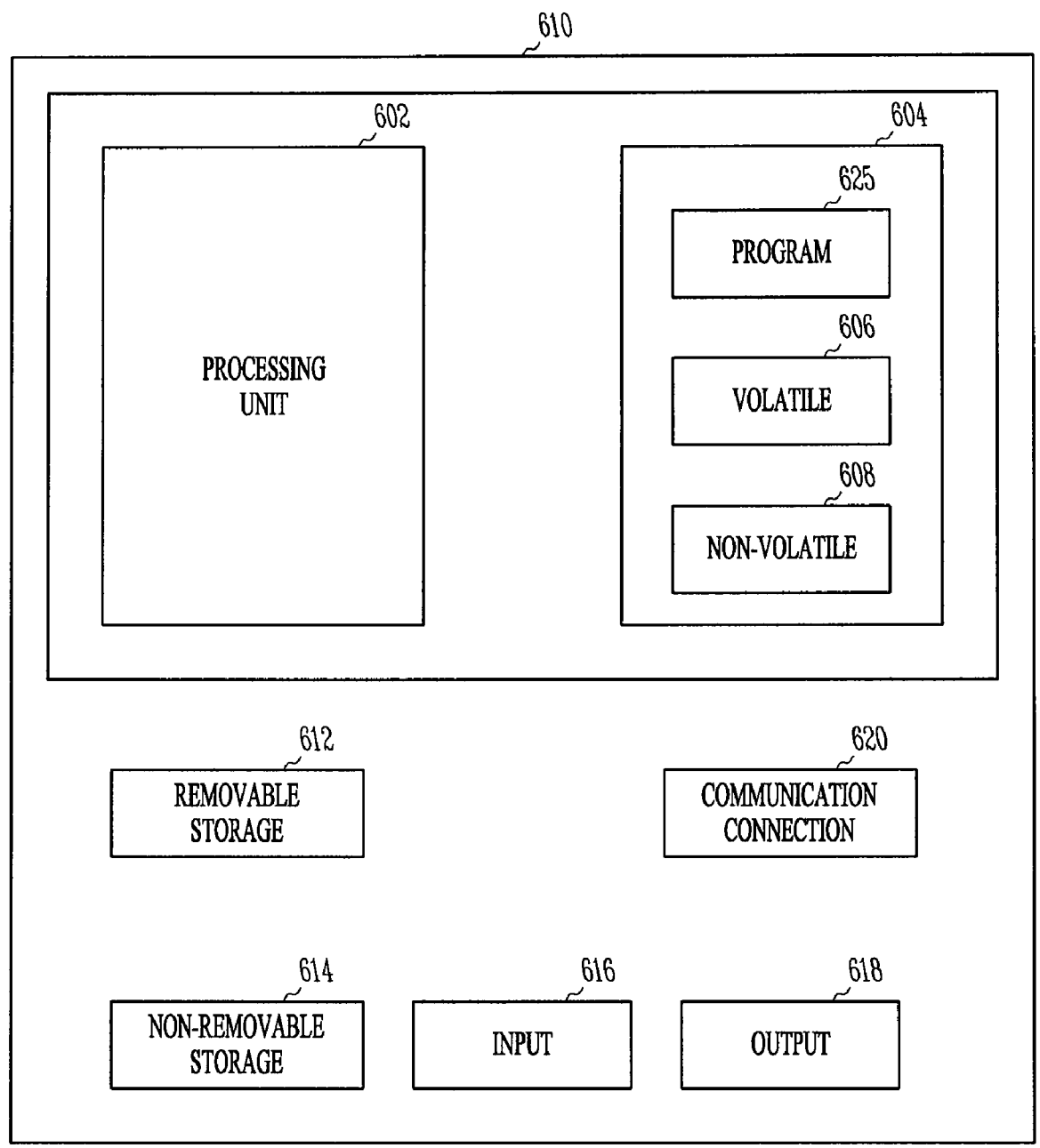
FIG. 6 is a block diagram of a computer system that executes programming for performing methods according to an example embodiment.

A block diagram of a computer system that executes programming for performing the above algorithm is shown in FIG. 6. A general computing device in the form of a computer 610, may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 610. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer implemented method comprising:
   determining if a machine, of a plurality of machines in a center, is capable of making energy utilization measurements;
   if the machine is not capable of making energy utilization measurements then estimating energy utilization information for the machine;
   collecting energy utilization information, including the energy utilization measurements, for the plurality of machines in the center, such machines originating from multiple vendors;
   instantiating an energy management object for each machine, wherein energy utilization is aggregated using such energy management objects; and
   aggregating the energy utilization for the center for controlling overall energy utilization for the center.

2. The method of claim 1 and further comprising:
   discovering machines in the center; and
   using an adapter for each machine to determine how to collect the energy utilization information.

3. The method of claim 1 wherein each energy management object has properties, a profile and a policy.

4. The method of claim 3 wherein a policy specifies actions to be taken should an energy utilization threshold be exceeded or an event trigger activated or deactivated.

5. The method of claim 3 wherein a profile describes behavior and operation of a device within the context of directing work to a specific machine or managing the behavior of a specific computing, communication, or other information processing, power consuming device or devices in a collective physical or logical entity.

6. The method of claim 1 wherein energy utilization information is used to control cooling equipment within the data center.

7. The method of claim 6 wherein cooling equipment is controlled as a function of a threshold of energy utilization for the center.

8. The method of claim 1 wherein energy utilization information is used to cycle machines on and off in the data center to reduce predicted future energy utilization.

9. A computer implemented method comprising:
   determining if heterogeneous equipment is capable of making energy utilization measurements;
   if the equipment is not capable of making energy utilization measurements then estimating energy utilization information for the equipment;
   collecting energy utilization information, including the energy utilization measurements, for the heterogeneous equipment in a center regardless of vendor or manufacturer;
   instantiating an energy management object for each equipment in the center;
   aggregating the energy utilization for the center based on the instantiated energy management objects;
   predicting future energy utilization as a function of historical aggregated energy utilization trends; and
   managing energy utilization for the center as a function of the aggregated energy utilization for the center and the predicted future energy utilization.

10. The method of claim 9 wherein energy utilization information is used to control facilities-based appliances or other environmental control equipment, including devices, within the center.

11. The method of claim 10 wherein facilities-based appliances or other environmental control equipment, including devices, is controlled as a function of a threshold of energy utilization for the center.

12. The method of claim 9 wherein energy utilization information is used to cycle machines on and off in the data center to reduce predicted future energy utilization.

13. The method of claim 9 wherein an energy management object has properties, a profile and a policy.

14. The method of claim 13 wherein a policy specifies actions to be taken should an energy utilization threshold be exceeded.

15. The method of claim 9 wherein future energy utilization is predicated as a function of workload history and scheduled processing jobs.

16. A computer implemented method comprising:
   determining if heterogeneous equipment is capable of making energy utilization measurements;
   if the heterogeneous equipment is not capable of making energy utilization measurements then estimating energy utilization information for the equipment;

collecting energy utilization information, including the energy utilization measurements, for the heterogeneous equipment in multiple centers regardless of vendor or manufacturer;

instantiating an energy management object for each equipment in the center;

aggregating the energy utilization for each center based on the instantiated energy management objects; and managing energy utilization for the centers as a function of the aggregated energy utilization for the centers.

17. The method of claim 16 wherein the centers are data centers, and energy utilization is managed by redistributing work between the data centers.

18. The method of claim 17 wherein work is distributed away from data centers exceeding predetermined energy utilization thresholds.

19. The method of claim 18 wherein selected equipment in data centers having work distributed away, are placed in lower power consumption modes.

20. The method of claim 16 and further comprising instantiating an energy management object for any energy consuming entity in the center, to include each piece of equipment, wherein an energy management object has properties, a profile and a policy.

* * * * *